(No Model.) 2 Sheets—Sheet 2.

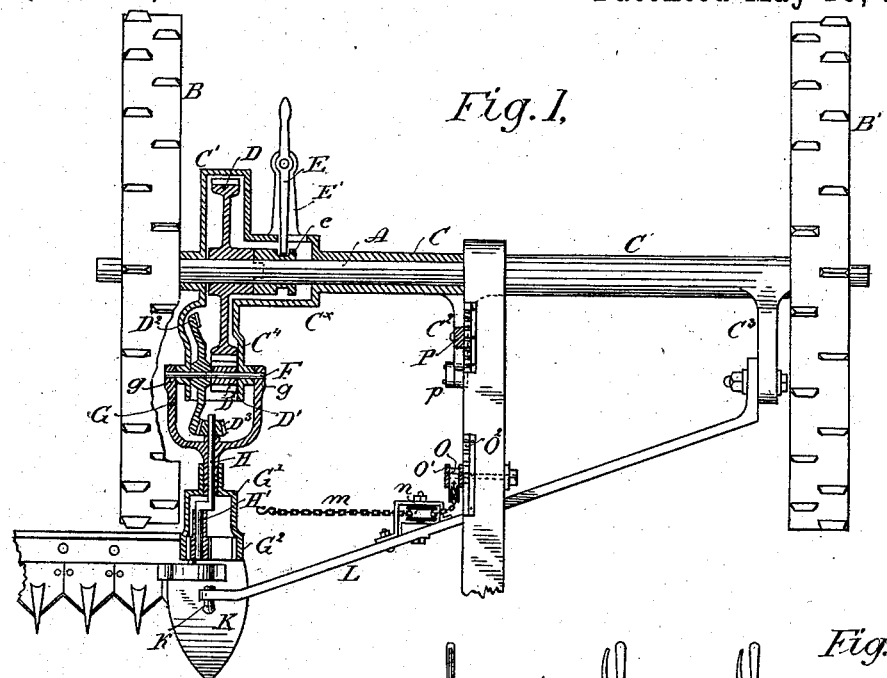

W. GAUSE.
MOWING MACHINE.

No. 257,858. Patented May 16, 1882.

WITNESSES
Ernest Abshagen
W. C. Chaffee

By his Attorney

Wm Gause
INVENTOR

UNITED STATES PATENT OFFICE.

WILLIAM GAUSE, OF KOKOMO, INDIANA.

MOWING-MACHINE.

SPECIFICATION forming part of Letters Patent No. 257,858, dated May 16, 1882.

Application filed March 25, 1882. (No model.)

*To all whom it may concern:*

Be it known that I, WILLIAM GAUSE, of Kokomo, county of Howard, and State of Indiana, have invented new and useful Improvements in Mowing-Machines, of which the following is a full, clear, and exact description, reference being had to the accompanying drawings, making part of this specification, in which—

Figure 4:
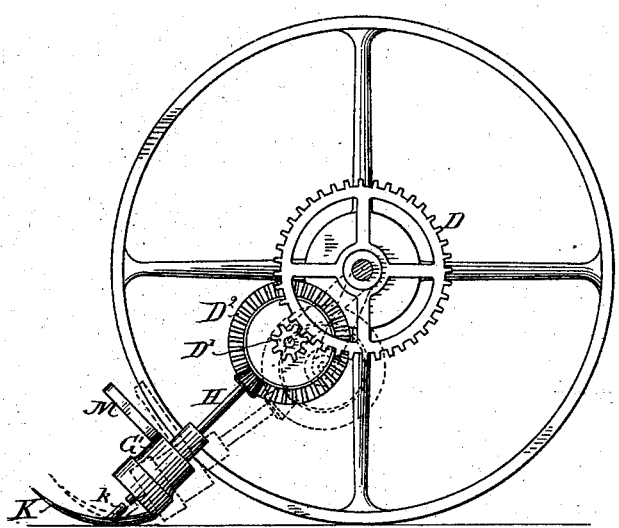
Figure 5:
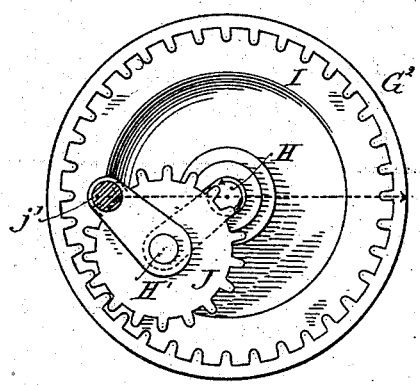
Figure 6:
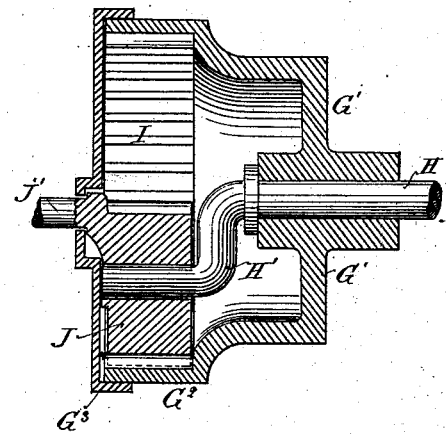

Figure 1 is a plan or top view, partly in section, of a mowing-machine with my improvements applied. Fig. 2 is a front elevation of the same, also partly in section, to show the arrangement of some of the parts. Figs. 3 and 4 are vertical longitudinal sections taken in different planes. Fig. 5 is a face view of the crank-shaft sleeve and gearing, with the slotted cover removed, and Fig. 6 is a longitudinal section through said sleeve and gearing.

My invention relates to a novel construction of the mower-frame, and to a novel arrangement of gearing in connection therewith, facilitating the adjustment of the cutters; to a novel manner of connecting the knife-bar with the crank actuating it, and to a novel arrangement of means for effecting the adjustment of the cutting apparatus and frame, as hereinafter explained.

In the accompanying drawings, A represents the main axle of the machine, and B B' the main carrying and driving wheels, mounted upon and connected with said axle in practice by backing-ratchets, which serve to rotate the axle in the forward movement of the machine, but allow it to remain stationary when the machine is backed.

Upon the axle A is mounted a tubular frame, C, provided with projecting arms C', C², and C³, the first-named, C', being made in form approximating a cylindrical casing, inclosing the main spur-gear wheel D, mounted on the axle. Upon one side of the casing C' is formed a cylindrical hub-like projection, C$^x$, covering the hub of the wheel D on that side, and a clutch, $e$, feathered to and sliding on the axle A, for connecting the wheel D with or disconnecting it from the shaft or axle. The clutch hub or collar has an annular groove formed in it, and a fork or lever, E, the lower end of which enters said groove, passes up through the slot or perforation in the upper wall of the cylindrical hub C$^x$, and is pivoted in a lug or standard, E', formed thereon, for enabling the driver to throw the driving-gear D into or out of action, as required. The casing-arm C' is somewhat extended, or has an eccentric formation on its forward open end, C⁴, and the side walls of such extension are provided with bearings for a short secondary shaft, F, upon which is mounted loosely a pinion, D', which engages with and receives motion from the gear D, and has a bevel-wheel, D², rigidly secured to and turning with it. The shaft F extends beyond its bearings in the casing C', and its projecting ends, or those of its sleeve-bearings, serve as a pivot for a crank-shaft, yoke, or casing-sleeve, G, provided on its pivoted end with perforated lugs or ears $g$, surrounding and turning on the ends of the shaft F, or of the projecting sleeve-bearings therefor. The casing-sleeve G at its pivoted end is enlarged to embrace or surround and cover the half of the bevel-gear D², projecting from the casing C', and a bevel-pinion, D³, on the crank-shaft H, engaging with and actuated by said wheel D². The swinging end of the yoke or casing-sleeve G is reduced in size, and forms or is provided with bearings for the crank-shaft H, and serves as a pivot for a second casing-sleeve, G', surrounding and turning thereon. The forward or outer end of the sleeve G', where it surrounds the crank H', is enlarged to accommodate the movement of said crank, and at its extreme forward end, G², is still further enlarged and provided with an internal annular gear at. I, with which a pinion, J, mounted loosely on the crank wrist or pin H', engages, receiving rotary motion therefrom.

The casing-sleeve G' is rigidly secured to the inner shoe, K, to which the finger-bar is rigidly attached at its inner end, and may, if desired, be formed in one piece with said shoe. The shoe is provided in advance of the casing-sleeve G' and in line with the crank-shaft H, extended with suitable lugs for or with a pivot-pin, $k$, to which the outer end of an oblique brace-rod, L, is connected, the inner end of said rod being pivoted to the arm C³ in line with the short transverse shaft F.

By the construction of frame and casing-sleeves described the sleeve G' and the shoe and finger-bar rigidly connected therewith are adapted to turn upon the sleeve G and around the crank-shaft as a center. Said parts, in connection with the casing-sleeve G and the shoe-brace L, are also adapted to turn or be adjusted upon their pivotal connection with the frame-sleeve C in line with or upon the transverse shaft F as a center, and the frame C being adapted to be adjusted or vibrated around the main axle, it will be seen that the several adjustments referred to, being upon or around the gear-shafts, they will be effected without disturbing the operative relation of or in any way cramping the gearing.

The casing-sleeve G' is provided on its upper side with an upright arm or lever, M, from which a chain, $m$, extends inward underneath a guiding-sheave, $n$, applied to the shoe-brace, and thence up to a grooved quadrant, O, mounted on a stud or pin on the tongue or tongue plate or frame, and provided with a hand-lever, O', by means of which it can be adjusted for rocking the casing-sleeve G' on the sleeve G. The tongue or tongue-plate is pivoted to or upon the frame-sleeve C in any convenient or preferred way, and is provided in rear of the quadrant-lever O' with a short lateral stud or pivot, upon which is mounted a bell-crank or angular lever, P, the short horizontal arm of which is connected by a link, $p$, with the frame-arm $C^2$, said arrangement enabling the driver to rock the frame C upon the axle for adjusting the angle of inclination of the cutters to the ground. The levers O' and P are provided each with a latch or pawl adapted to engage with quadrant-racks $o^2$ and $p^2$ on the tongue or tongue-frame for holding them at any desired adjustment, and with thumb-levers, which serve, when the lever is grasped, for moving it to release the pawl from the rack. By drawing the lever O' back it will be seen that the outer end of the cutting apparatus can be rocked upward, turning with the rolling casing-sleeve G' until the cutting apparatus is made to assume a vertical, or nearly vertical, position, if desired, when the lever, acting upon the inner end thereof through the shoe-brace L, will serve to raise said end also, while by adjusting the lever P the points of the cutters can be rocked up or down, as the character of the work may require.

The pinion J, above referred to as mounted and turning freely on the crank wrist or pin H', is one-half of the diameter, or rather is provided with one-half the number of teeth that the intermeshing toothed rim $G^2$, with which it engages, has, and the crank wrist or pin upon which it is mounted serves as an eccentric, rolling the pinion with it around in mesh with and causing it to be rotated by said toothed rim, and in such movement at each revolution of the crank-wrist H' a revolution in a reverse direction is imparted to the pinion J. The latter is provided with a crank wrist or pin, $j'$, on its outer face, arranged to center on the pitch-line of its teeth in such manner as that its throw, due to the double rotary movement of the pinion described, will be equal to the internal diameter of the toothed rim $G^2$, with which it engages, and the pinion being placed upon the crank-wrist H', with the two crank wrists at their extreme outer throw, as indicated in Fig. 2, when motion is imparted to the crank-shaft H the wrist $j'$, while rotating, as explained, has a horizontal reciprocating movement imparted to it, adapting it to be connected directly with the sickle-bar head, as shown, for reciprocating said bar. By this arrangement I am enabled to dispense with the usual connecting-rod or pitman, and to connect the reciprocating knife-head directly to its actuating crank-wrist.

The open end of the sleeve or toothed rim $G^2$ may be provided with a cap or cover, $G^3$, provided with a horizontal slot for the crank-wrist $j'$ to work in, said cover serving to protect the inclosed gearing.

Under the construction of the casing frames and sleeves, as described and shown, the inner shoe is brought between the longitudinal vertical plane of the wheels B and B', just inside of the plane of the inner vertical face of the former. By this arrangement the inner finger adjacent to the shoe K, and also the inner section of the sickle, is brought in front of or into line with the path or tread of said driving-wheel B, and serves to insure the cutting of the grass in front thereof. In practice, also, the truck or power is made of sufficient width to cause the outer wheel, B', to travel in the track cleared by the swather on a previous round, or, in other words, to cause the wheels to stride the preceding swath, thus preventing the rolling down of the grass. The sickle-sections are of a width conforming to the distance between the vertical longitudinal centers of the guards or fingers, and the throw of the crank is made just sufficient, and is so arranged as to move the points of the cutters from center to center of said fingers, and being thus arranged it will be seen that under the construction and arrangement of the parts described no adjustment of the frames or casing-sleeves of the cutting apparatus itself will disturb the exact working relation of the sickle-sections to the guards or fingers.

By this construction and arrangement of parts described a simple, compact, and durable machine is secured—one not liable to get out of order, and one in which all danger of cramping or binding the gearing or other moving parts is effectually avoided.

Having now described my invention, I claim—

1. The tubular main frame inclosing and protecting the main driving-gear, in combination with the pivoted casing-sleeves and shoe-brace connecting the cutting apparatus with said frame, substantially as described.

2. The tubular main frame, surrounding the axle and provided with the arms C' and $C^3$, in combination with the cutter-frame hinged thereto in line with the pinion-shaft, the lever-arm $C^2$, the pivoted tongue, and the adjusting-lever, arranged and operating substantially as described.

3. The casing-sleeve G', surrounding the crank-shaft and rigidly connected with the finger-bar, in combination with the internal gear for actuating the crank to which the sickle-bar is attached.

4. The crank-wrist actuating the sickle-bar, in combination with the pinion on the crank-shaft, and the internally-geared rim for actuating said crank-wrist, whereby the latter is adapted to move in right lines and to be connected directly to the reciprocating sickle-bar head, substantially as described.

5. The reciprocating sickle-bar, in combination with an actuating crank-wrist connected directly thereto, and mechanism by which said crank-wrist is reciprocated in right lines, substantially as and for the purpose set forth.

6. The crank-shaft sleeve pivoted to and adjustable around the secondary shaft as a center, in combination with the sleeve to which the inner shoe is rigidly connected, pivoted and turning upon the crank-shaft sleeve, and the means for adjusting said sleeves, arranged and operating in connection with the hinged shoe-brace and the hinged pole or tongue frame, substantially as described.

7. The combination, with the main drive-wheel axle, of the tubular casing-frame C, provided with the arms C', C², and C³, the casing-sleeves G and G', the latter rigidly connected with the shoe, brace L, and lifting-levers O' and P, substantially as described.

In testimony whereof I have hereunto set my hand.

WILLIAM GAUSE.

Witnesses:
JAMES D. CHANDLER,
E. A. SEFFNER.